(12) United States Patent
Karasawa et al.

(10) Patent No.: US 10,787,993 B2
(45) Date of Patent: Sep. 29, 2020

(54) VALVE DEVICE AND EXHAUST HEAT RECOVERY SYSTEM

(71) Applicant: MIKUNI CORPORATION, Tokyo (JP)

(72) Inventors: Toshio Karasawa, Kanagawa (JP); Toshiaki Ishii, Kanagawa (JP); Takashi Watabe, Kanagawa (JP)

(73) Assignee: MIKUNI CORPORATION, Tokyo (JP)

( * ) Notice: Subject to any disclaimer, the term of this patent is extended or adjusted under 35 U.S.C. 154(b) by 51 days.

(21) Appl. No.: 16/073,798

(22) PCT Filed: Jan. 26, 2017

(86) PCT No.: PCT/JP2017/002729
§ 371 (c)(1),
(2) Date: Jul. 29, 2018

(87) PCT Pub. No.: WO2017/131085
PCT Pub. Date: Aug. 3, 2017

(65) Prior Publication Data
US 2019/0032598 A1  Jan. 31, 2019

(30) Foreign Application Priority Data

Jan. 29, 2016 (JP) ................. 2016-015974

(51) Int. Cl.
*F02G 5/02*  (2006.01)
*F01N 5/02*  (2006.01)
(Continued)

(52) U.S. Cl.
CPC ................. *F02G 5/02* (2013.01); *F01N 5/02* (2013.01); *F01N 13/08* (2013.01); *F01P 3/18* (2013.01);
(Continued)

(58) Field of Classification Search
CPC . F16K 1/22; F16K 1/226; F16K 27/02; F16K 27/0218; F01P 3/18; F02G 5/02;
(Continued)

(56) References Cited

U.S. PATENT DOCUMENTS 3,343,805 A * 9/1967 Felton ................. F16K 1/22
251/306
6,739,579 B1   5/2004 Rim
(Continued)

FOREIGN PATENT DOCUMENTS

CN   2076193   5/1991
CN   1332828   1/2002
(Continued)

OTHER PUBLICATIONS

"Search Report of Europe Counterpart Application", dated Aug. 27, 2019, p. 1-p. 9.
Office Action of China Counterpart Application, with English translation thereof, dated Apr. 12, 2019, pp. 1-10.
"International Search Report (Form PCT/ISA/210) of PCT/JP2017/002729," dated Mar. 21, 2017, with English translation thereof, pp. 1-4.

*Primary Examiner* — Audrey K Bradley
(74) *Attorney, Agent, or Firm* — JCIPRNET

(57) ABSTRACT

This valve device is provided with: a body (10) that has at least one passage (11, 12) for passing a fluid and valve shaft holes (13, 14, 15); a valve shaft (20), which is passed through the valve shaft holes so as to be rotatable; and butterfly valves (30, 40), which are fixed on the valve shaft and are for opening and closing the passages (11, 12). The butterfly valves (30, 40) are disposed so as to close the passages (11, 12) on a downstream side or an upstream side of the valve shaft holes (13, 14, 15) in a flow direction of the fluid. As a result, it is possible to prevent fluid leakage and achieve effective utilization of exhaust heat in an exhaust heat recovery system.

6 Claims, 7 Drawing Sheets

(51) Int. Cl.
*F01N 13/08* (2010.01)
*F16K 1/22* (2006.01)
*F16K 1/226* (2006.01)
*F01P 3/18* (2006.01)
*F02D 9/10* (2006.01)
*F02D 9/04* (2006.01)
*F16K 27/02* (2006.01)

(52) U.S. Cl.
CPC ............. *F02D 9/04* (2013.01); *F02D 9/1025* (2013.01); *F16K 1/22* (2013.01); *F16K 1/226* (2013.01); *F16K 27/02* (2013.01); F01N 2240/36 (2013.01); F02D 9/1045 (2013.01); F02D 9/1095 (2013.01); F16K 27/0218 (2013.01); Y02T 10/16 (2013.01)

(58) Field of Classification Search
CPC ........ F01N 5/02; F01N 13/08; F01N 2240/36; F02D 9/04; F02D 9/1025; F02D 9/1045; F02D 9/1095; Y02T 10/16
See application file for complete search history.

(56) References Cited

U.S. PATENT DOCUMENTS

| | | | |
|---|---|---|---|
| 7,845,338 B2* | 12/2010 | Smith | ............ F28D 7/1669 |
| | | | 123/568.12 |
| 10,125,651 B2* | 11/2018 | Takahata | ............... F01N 3/2066 |
| 2011/0297862 A1 | 12/2011 | Womann et al. | |
| 2012/0181468 A1 | 7/2012 | Telep et al. | |

FOREIGN PATENT DOCUMENTS

| | | |
|---|---|---|
| JP | S5233330 | 8/1977 |
| JP | H06229261 | 8/1994 |
| JP | H074275 | 1/1995 |
| JP | H07217458 | 8/1995 |
| WO | 0150047 | 7/2001 |
| WO | 2015098952 | 7/2015 |

* cited by examiner

VALVE DEVICE AND EXHAUST HEAT RECOVERY SYSTEM

CROSS-REFERENCE TO RELATED APPLICATION

This application is a 371 application of the international PCT application Ser. No. PCT/JP2017/002729, filed on Jan. 26, 2017, which claims the priority benefit of Japan application No. 2016-015974, filed on Jan. 29, 2016. The entirety of each of the above-mentioned patent applications is hereby incorporated by reference herein and made a part of this specification.

BACKGROUND OF THE INVENTION

1. Field of the Invention

The present invention relates to a butterfly valve device which opens and closes the fluid passage, in particular to the valve device which is applied to an exhaust heat recovery system and so on that make the exhaust gas of an engine go through a heat exchanger and warm the cooling water, and to an exhaust heat recovery system using this valve device.

2. Description of Related Art

As a conventional valve device, the following valve device is known which is provided with: a body, which has a main passage, a sub-passage and a valve shaft hole perpendicular to the two passages; a valve shaft passed through the valve shaft hole; and two butterfly valves, which are disposed separately on the two passages and are fixed to the valve shaft, and when one of which is closed, the other becomes open (see patent literature 1 for example).

This valve device is connected to an exhaust gas system of an automobile, and in the state when one of the butterfly valves closes the main passage, the other of the butterfly valves fully opens the sub-passage and leads the exhaust gas to a catalytic converter and so on.

However, in this valve device, the center of the butterfly valve in the thickness direction is located on the central line of the valve shaft. That is, the valve device is formed in a manner that in the direction in which the exhaust gas passes the passage, the region overlapping with the valve shaft hole that permits the passing of the valve shaft is opened and closed with the butterfly valve.

For this reason, there is a risk that when the pressure of the upstream side becomes high due to the resistance of the catalytic converter, the exhaust gas passes through a clearance between the valve shaft and valve shaft hole and flows to the main passage side, making it impossible to effectively utilize the heat of the exhaust gas.

LITERATURE OF PRIOR ART

Patent Literature

Patent literature 1: Japanese Laid-open No. 7-4275

SUMMARY OF THE INVENTION

Problems to be Solved by the Invention

The present invention provides a valve device and an exhaust heat recovery system using this valve device, which solve the problems of the aforementioned prior art, and realizes the prevention of fluid leakage from the valve shaft hole and the effective utilization of exhaust gas heat.

Means to Solve the Problems

The valve device of the present invention is a structure which is provided with: a body that has at least one passage for passing a fluid and valve shaft holes; a valve shaft, which is passed through the valve shaft holes so as to be rotatable ; and at least one butterfly valve, which is fixed to the valve shaft and is for opening and closing the passage; the butterfly valve is disposed so as to close the passage on a downstream side or an upstream side of the valve shaft holes in a flow direction of the fluid.

In the aforementioned structure, the following structure may be adopted in which the butterfly valve is disposed so as to close the passage on the downstream side or the upstream side which deviates from a central line of the valve shaft holes for a distance greater than the radius of the valve shaft holes.

In the aforementioned structure, the following structure may be adopted in which the body has a first passage for passing the fluid, a second passage for passing the fluid, and the valve shaft holes formed so as to cause the first passage to communicate with the second passage; a first butterfly valve for opening and closing the first passage, and a second butterfly valve for opening and closing the second passage in a phase opposite to the first butterfly valve are fixed to the valve shaft; and the first butterfly valve is disposed so as to close the first passage on the downstream side of the valve shaft holes.

In the aforementioned structure, the following structure may be adopted in which the first butterfly valve is disposed so as to close the first passage on the downstream side which deviates from the central line of the valve shaft holes for a distance greater than the radius of the valve shaft holes.

In the aforementioned structure, the following structure may be adopted in which the second butterfly valve is disposed so as to close the second passage on the upstream side which deviates from the central line of the valve shaft holes for a distance greater than the radius of the valve shaft holes.

In the aforementioned structure, the following structure may be adopted in which the valve shaft is supported at two ends thereof via a bearing mounted on the body so as to be rotatable.

In the aforementioned structure, the following structure may be adopted which comprises a pressing component that presses the valve shaft to one side in an axis direction of the valve shaft.

The exhaust heat recovery system of the present invention is provided with: a main exhaust gas pipe for passing an exhaust gas of an engine; a circumvention exhaust gas pipe, which diverts from the main exhaust gas pipe; a valve device, which is disposed in a midway of the main exhaust gas pipe and the circumvention exhaust gas pipe; and a heat exchanger, which is connected to the midway of the circumvention exhaust gas pipe and on a downstream side of the valve device; and any valve device with the aforementioned structure is adopted as the valve device.

Effect of the Invention

According to the valve device with the aforementioned structure, the structure can be simplified, and the fluid such as exhaust gas can be prevented from leaking outside through the valve shaft holes without increasing components. Besides, even if the fluid such as exhaust gas leaks from one passage to another passage, the leaked fluid can return to the one passage. For this reason, the heat of the fluid such as exhaust gas can be effectively utilized.

DESCRIPTION OF THE EMBODIMENTS

Figure 1:
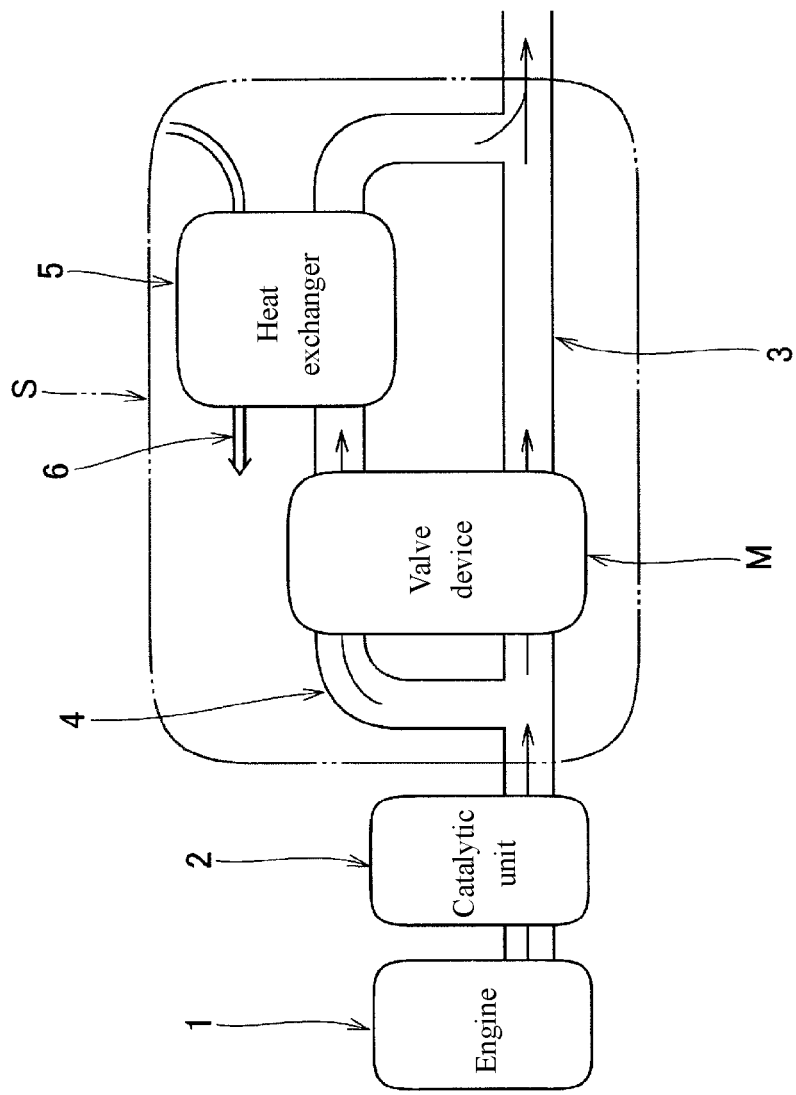
FIG. 1 is a schematic diagram showing an exhaust heat recovery system of an engine in which a valve device of the present invention is applied.
Figure 2:
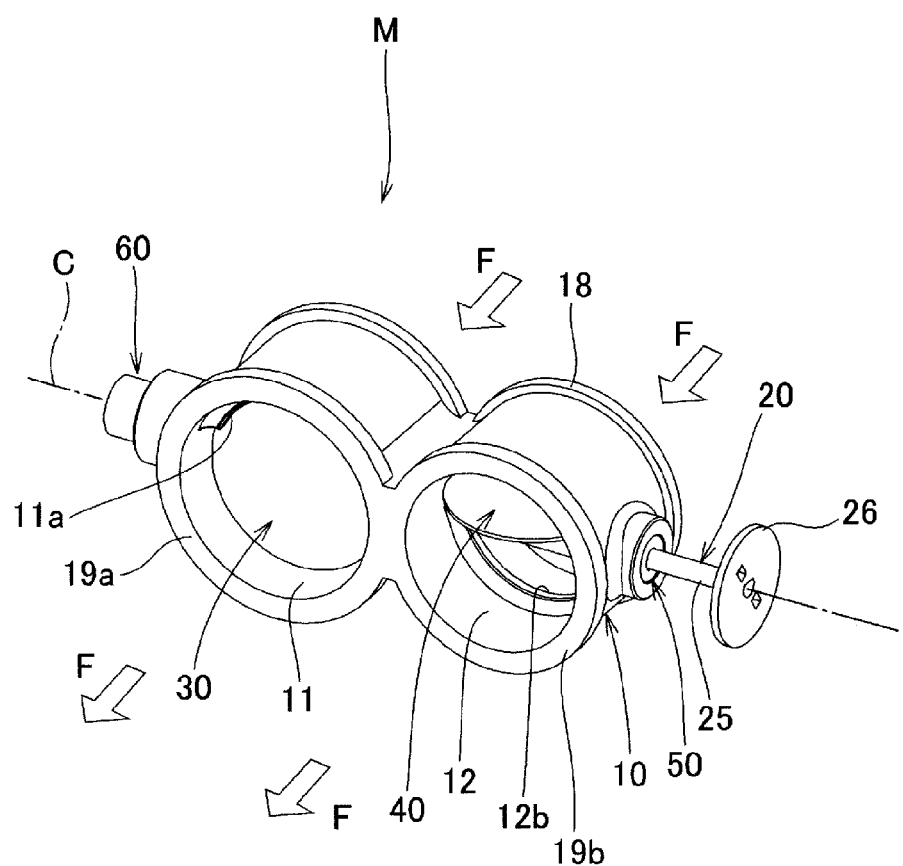
FIG. 2 is a perspective external view showing an embodiment of the valve device of the present invention.
Figure 3:
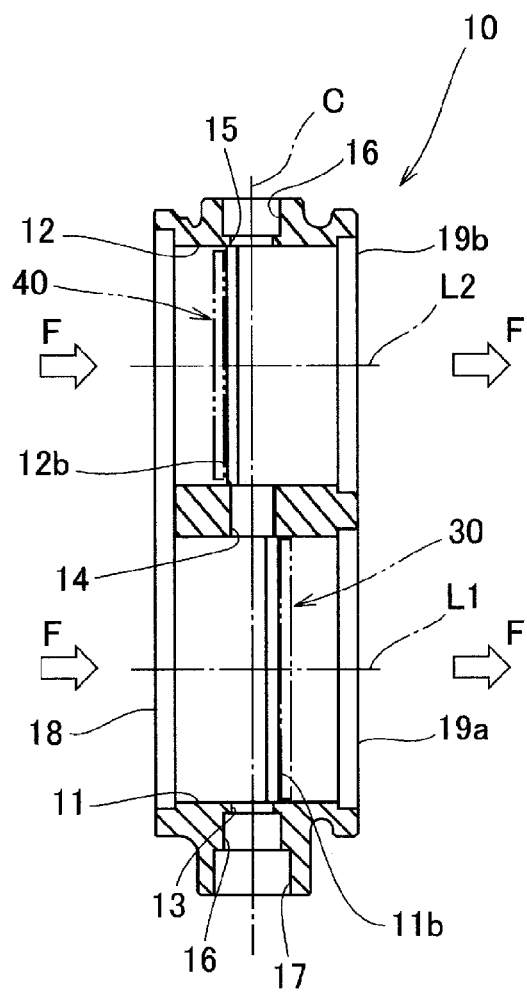
FIG. 3 is a cross-section view showing a first passage, a second passage and valve shaft holes contained in the valve device shown in FIG. 2.

In the following part, the embodiment of the present invention is described with reference to the attached FIG. 1 to FIG. 7.

A valve device M of the embodiment is applied to an exhaust heat recovery system S of an engine 1.

The exhaust heat recovery system S is provided with, in an exhaust system of the engine 1, a main exhaust gas pipe 3 which is connected to the downstream side of a catalytic unit 2 and passes exhaust gas, a circumvention exhaust gas pipe 4 diverting from the main exhaust gas pipe 3, the valve device M, a heat exchanger 5, and a pipe 6 for passing the cooling water.

The valve device M is disposed in the midway of the main exhaust gas pipe 3 and the circumvention exhaust gas pipe 4.

The heat exchanger 5 is connected to the midway of the circumvention exhaust gas pipe 4 and to the downstream side of the valve device M.

The pipe 6 is formed so as to be led to the heat exchanger 5 and transfers the heat of exhaust gas to the cooling water of the engine 1.

The valve device M is provided with a body 10, a valve shaft 20, a first butterfly valve 30, a second butterfly valve 40, two bearings 50, and a pressing component 60 (a cylindrical holder 61, a spring 62, a ball 63).

The body 10 is provided with: a first passage 11 and a second passage 12 for passing exhaust gas as the fluid; valve shaft holes 13, 14 and 15 through which the valve shaft 20 passes; two fitting holes 16 where the bearing 50 is mounted; a mounting concave 17 where the pressing component 60 is mounted; an upstream side flange 18, to which the main exhaust gas pipe 3 is connected; a downstream side flange 19a, to which the main exhaust gas pipe 3 is connected; and a downstream side flange 19b, to which the circumvention exhaust gas pipe 4 is connected.

The first passage 11 is a cylinder shape taking an axis line L1 as the center, and is provided with two sealing parts 11a, 11b which contact with the first butterfly valve 30 in a position on the downstream side of the valve shaft holes 13, 14 in the flowing direction F of exhaust gas.

That is, the sealing parts 11a, 11b are formed so that in the position which deviates from a central line C of the valve shaft holes 13, 14 for distances D1, D2 (D1>R, D2>R, D1>D2) slightly greater than the radius R of the valve shaft holes 13, 14 on the downstream side, surfaces 32, 33 of the first butterfly valve 30 which is in a closing state that closes the first passage 11 are contacted with each other.

Here, the sealing parts 11a, 11b are formed as arc-shaped protruding sheets which protrude toward the inside of the first passage 11 except the region near the valve shaft holes 13, 14, so that the first butterfly valve 30 is capable of performing opening and closing action.

The second passage 12 is a cylinder shape taking an axis line L2 parallel to the axis line L1 as the center, and is provided with two sealing parts 12a, 12b which contact with the second butterfly valve 40 in a position on the upstream side of the valve shaft holes 14, 15 in the flowing direction F of exhaust gas.

That is, the sealing parts 12a, 12b are formed so that in the position which deviates from the central line C of the valve shaft holes 14, 15 for distances D1, D2 (D1>R, D2>R, D1>D2) slightly greater than the radius of the valve shaft holes 14, 15 on the upstream side, surfaces 42, 43 of the second butterfly valve 40 which is in a closing state that closes the second passage 12 are contacted with each other.

Here, the sealing parts 12a, 12b are formed as arc-shaped protruding sheets which protrude toward the inside of the second passage 12 except the region near the valve shaft holes 14, 15, so that the second butterfly valve 40 is capable of performing opening and closing action.

The valve shaft holes 13, 14, 15 are formed so as to line up in the central line C extending perpendicularly to the axis lines L1, L2.

The valve shaft hole 13 is formed to a cylinder shape, which communicates with the first passage 11 from outside on one side of the body 10, and has an internal diameter (2R) with which a first end 21 of the valve shaft 20 is embedded to be rotatable.

The valve shaft hole 14 is formed to a cylinder shape, which communicates with the first passage 11 and the second passage 12 in the middle part of the body 10, and has an internal diameter (2R) with which an middle part 22 of the valve shaft 20 is embedded to be rotatable.

The valve shaft holes 15 is formed to a cylinder shape, which communicates with the second passage 12 from outside on the other side of the body 10, and has an internal diameter (2R) with which a second end 23 of the valve shaft 20 is embedded to be rotatable.

The fitting hole 16 is formed to a cylinder shape which has an internal diameter for the bearing 50 to be securely embedded without any clearance.

The mounting concave 17 is formed to an internal diameter which securely fits the cylindrical holder 61 that accommodates the ball 63 and the spring 62 or to female screw that screws together with the cylindrical holder 61.

The valve shaft 20 is formed to a cylinder shape which extends coaxially with the central line C of the valve shafts 13, 14, 15.

Besides, the valve shaft 20 is provided with: the first end 21, the middle part 22 and the second end 23, which have the same external diameter; a diameter contracting part 24, which is formed on the external side of the first end 21; a diameter contracting part 25, which is formed on the external side of the second end 23; and a connecting part 26, which is formed at the front end of the diameter contracting part 25.

The first end 21, the middle part 22, and the second end 23 are formed to the external diameters with which they are embedded separately to the valve shaft holes 13, 14, and 15 of the body 10 so as to be rotatable.

In the valve shaft 20, the first butterfly valve 30 is fixed between the first end 21 and the middle part 22, besides, the second butterfly valve 40 is fixed between the middle part 22 and the second end 23 in a state of deviating the rotation phase for 90° with respect to the first butterfly valve 30.

That is, in the valve shaft 20, the first butterfly valve 30 for opening and closing the first passage 11 is fixed, and the second butterfly valve 40 for opening and closing the second passage 12 is fixed in a phase opposite to the first butterfly valve 30.

The diameter contracting parts 24, 25 are supported by the bearing 50 mounted on the fitting hole 16 of the body 10 so as to be rotatable.

The connecting part 26 is formed so as to be connected to an external driving source (not shown) and be affected by a rotary drive force.

The first butterfly valve 30 is provided with a fixing part 31 which is disk-shaped and is fixed to the valve shaft 20, the surface 32 contacting with the sealing part 11a, and the surface 33 contacting with the sealing part 11b.

The fixing part 31 is illustrated as a ring shape for passing the valve shaft 20; however, any fixing means can be applied as long as it is a fixing means that revolves the first butterfly valve 30 together with the valve shaft 20.

For example, fastening means using a screw, welding means such as spot welding, and fusion means can be enumerated.

Besides, the first butterfly valve 30 is disposed so as to close the first passage 11 on the downstream side of the valve shaft holes 13, 14 in the state of being fixed to the valve shaft 20.

That is, the first butterfly valve 30 is disposed so as to close the first passage 11 on the downstream side which deviates from the central line C of the valve shaft holes 13, 14 for the distances D1, D2 greater than the radius R of the valve shaft holes 13, 14.

As a result, when the first butterfly valve 30 is disposed deviating on the downstream side of the valve shaft holes 13, 14, by setting the deviating amount to an amount which slightly exceeds the radius R of the valve shaft holes 13, 14, an inertial moment around the center of the valve shaft 20 can be reduced. For this reason, the opening and closing movement of the first butterfly valve 30 can be smooth.

The second butterfly valve 40 is provided with a fixing part 41 which is disk-shaped and is fixed to the valve shaft 20, the surface 42 contacting with the sealing part 12a, and the surface 43 contacting with the sealing part 12b.

The fixing part 41 is illustrated as a ring shape for passing the valve shaft 20; however, any fixing means can be applied as long as it is a fixing means that revolves the first butterfly valve 40 together with the valve shaft 20.

For example, fastening means using a screw, welding means such as spot welding, and fusion means can be enumerated.

Besides, the second butterfly valve 40 is disposed so as to close the second passage 12 on the upstream side of the valve shaft holes 14, 15 in the state of being fixed to the valve shaft 20.

That is, the second butterfly valve 40 is disposed so as to close the second passage 12 on the upstream side which deviates from the central line C of the valve shaft holes 14, 15 for the distances D1, D2 greater than the radius R of the valve shaft holes 14, 15.

As a result, when the second butterfly valve 40 is disposed deviating on the downstream side of the valve shaft holes 14, 15, by setting the deviating amount to an amount which slightly exceeds the radius R of the valve shaft holes 14, 15, the inertial moment around the center of the valve shaft 20 can be reduced. For this reason, the opening and closing movement of the second butterfly valve 40 can be smooth.

The two bearing 50 are radial bearings, and are embedded in the fitting hole 16 of the body 10 to support the diameter contracting parts 24, 25 of the valve shaft 20 so that the diameter contracting parts 24, 25 are rotatable.

As a result, because the diameter contracting parts 24, 25 on two sides of the valve shaft 20 are supported via the bearing 50 mounted on the body 10 to be rotatable, the valve shaft 20 can be revolved smoothly compared with the situation of being supported through the valve shaft holes 13, 15 only.

Besides, by fitting the bearing 50 to the body 10, no clearance occurs between the bearing 50 and the body 10 and between the valve shaft 20 and the bearing 50, therefore exhaust gas (fluid) can be prevented from leaking out of the body 10.

In addition, among the two bearings 50, the bearing 50 disposed on the connecting part 26 side of the valve shaft 20 (that is, the outside of the valve shaft hole 15) functions as the aforementioned radial bearing, and also functions as the thrust bearing of the valve shaft 20 by receiving the step surface between the second end 23 of the valve shaft 20 and the diameter contracting part 2. For this reason, exhaust gas can be further prevented from leaking outside.

The pressing component 60 is provided with the cylindrical holder 61 having a bottom, the spring 62, and the ball 63.

The cylindrical holder 61 is formed to have an external diameter which securely fits in the mounting concave 17 of the body 10 or to male screw that is screws together with the mounting concave 17.

The spring 62 is a coil-shaped spring, and is formed so as to be embedded in the cylindrical holder 61 with a predetermined compression allowance.

The ball 63 is disposed so as to receive the pressing force of the compressed spring 62 and contacts an end surface 24a of the diameter contracting part 24 of the valve shaft 20.

As a result, by leaning the valve shaft 20 with the pressing force of the pressing component 60, the rattle of the valve shaft 20 can be prevented, and desired opening and closing movement can be obtained.

Next, description is made on the movement of the exhaust heat recovery system S to which the valve device M with the aforementioned structure is applied.

Figure 4A:
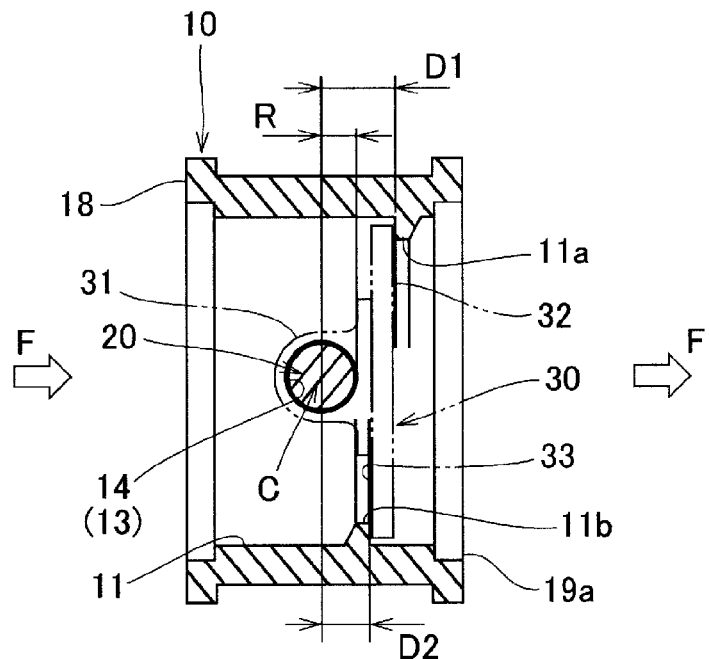
FIG. 4A is a cross-section view which shows the disposing relationship of the first passage, the valve shaft holes, the valve shaft, and the first butterfly valve contained in the valve device shown in FIG. 2, and shows the state in which the first butterfly valve closes the first passage.
Figure 4B:
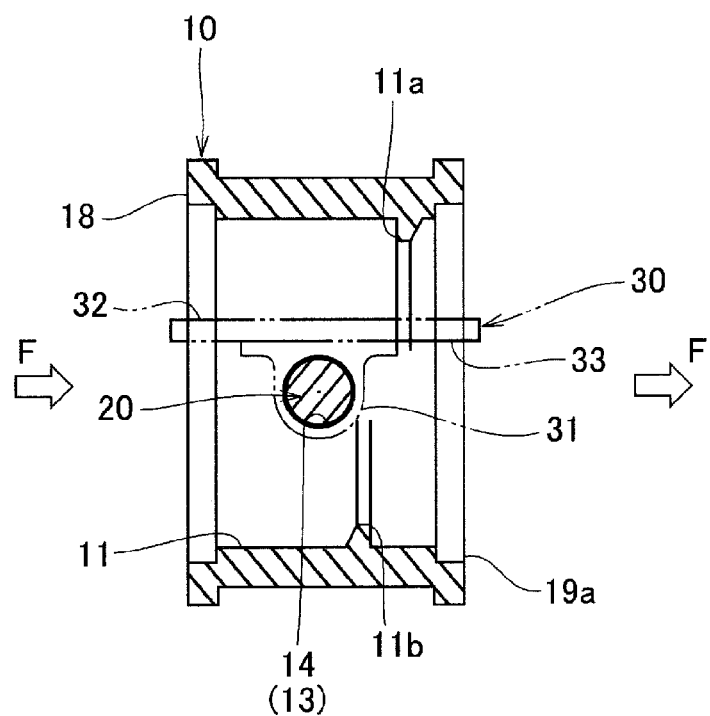
FIG. 4B is a cross-section view which shows the disposing relationship of the first passage, the valve shaft holes, the valve shaft, and the first butterfly valve contained in the valve device shown in FIG. 2, and shows the state in which the first butterfly valve opens the first passage.
Figure 5A:
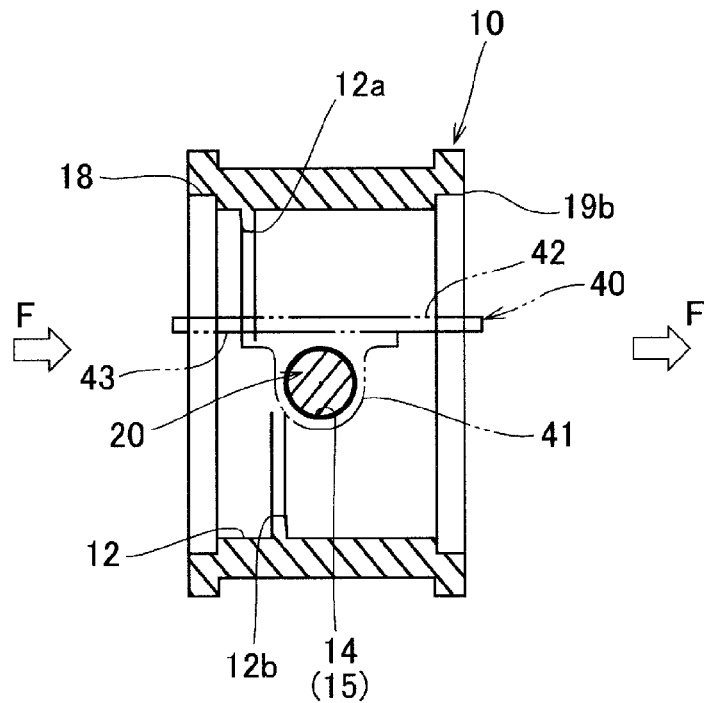
FIG. 5A is a cross-section view which shows the disposing relationship of the second passage, the valve shaft holes, the valve shaft, and the second butterfly valve contained in the valve device shown in FIG. 2, and shows the state in which the second butterfly valve opens the second passage.
Figure 5B:
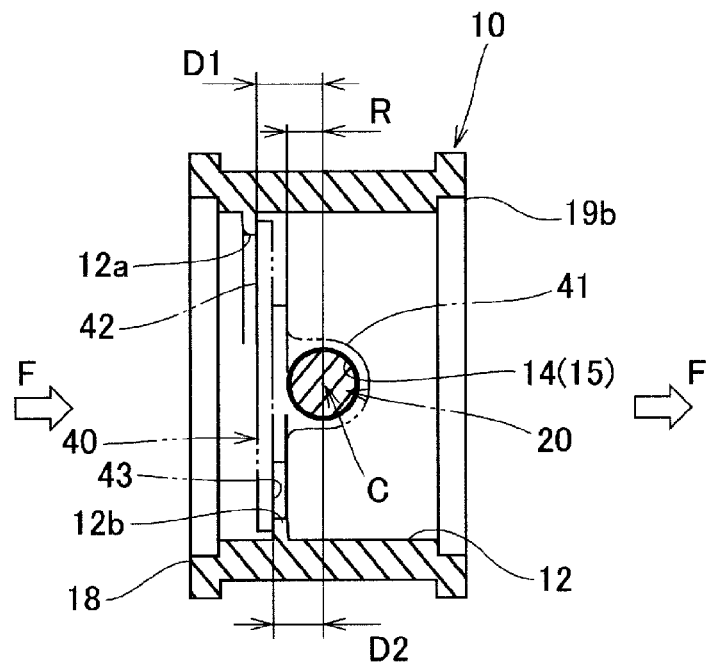
FIG. 5B is a cross-section view which shows the disposing relationship of the second passage, the valve shaft holes, the valve shaft, and the second butterfly valve contained in the valve device shown in FIG. 2, and shows the state in which the second butterfly valve closes the second passage.
Figure 6:
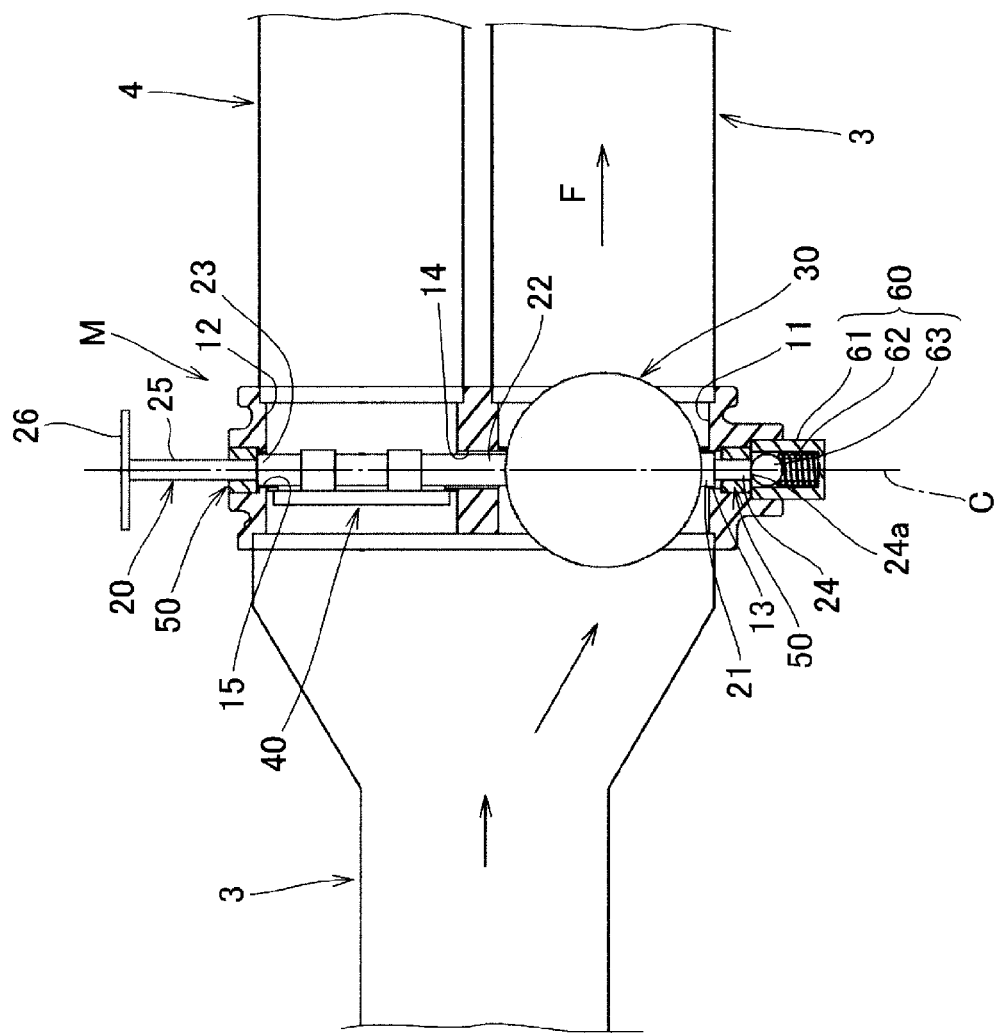
FIG. 6 is a cross-section view which shows the state of the first butterfly valve and the second butterfly valve during normal air release when the valve device shown in FIG. 2 is applied to the exhaust heat recovery system.

First, in a normal operation mode shown in FIG. 6, the first butterfly valve 30 is in an opening state which opens the first passage 11 as shown in FIG. 4B, and the second butterfly valve 40 is in a closing state which closes the second passage 12 as shown in FIG. 5B.

In this case, exhaust gas of the engine 1 is smoothly discharged outside from the main exhaust gas pipe 3 via the first passage 11 of the valve device M.

Here, because the second butterfly valve 40 closes the second passage 12 on the upstream side of the valve shaft holes 15, exhaust gas discharged from the main exhaust gas pipe 3 toward the second passage 12 side can be prevented from leaking outside through the valve shaft hole 15.

Figure 7:
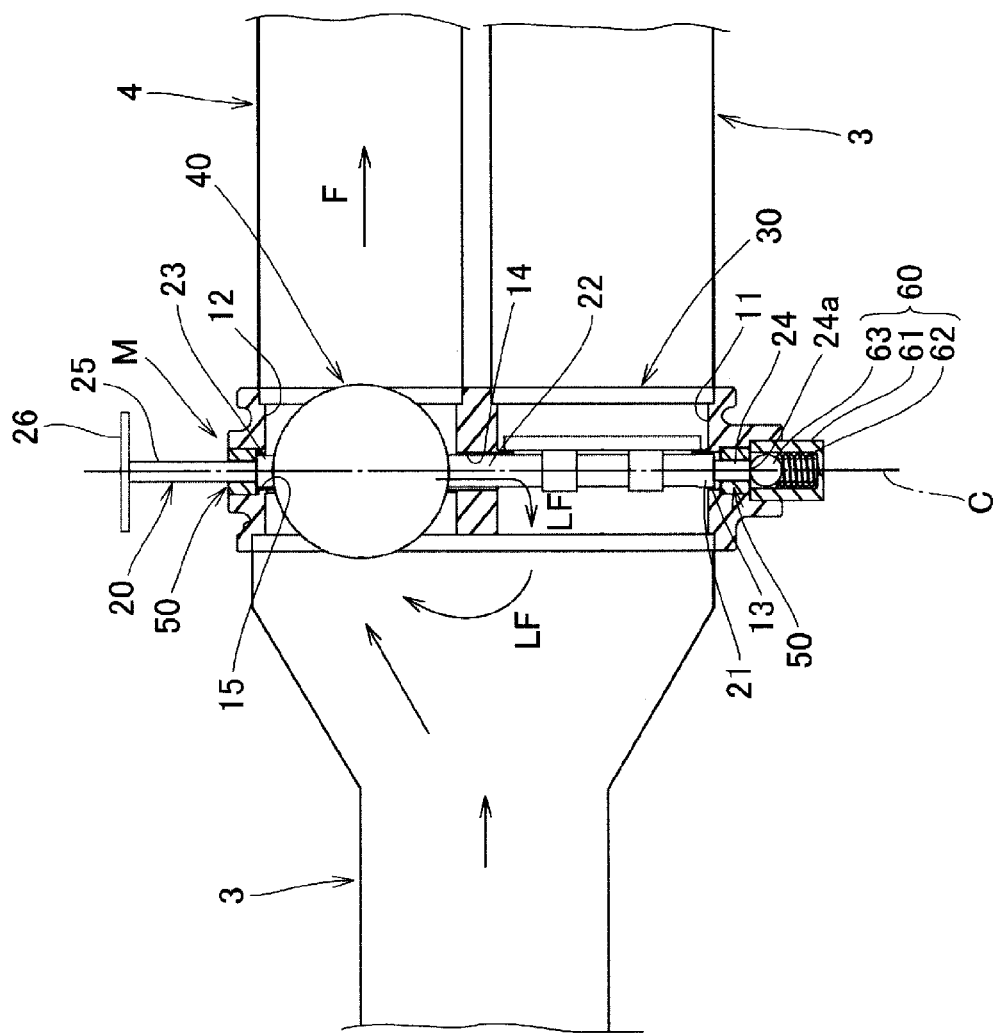
FIG. 7 is a cross-section view which shows the state of the first butterfly valve and the second butterfly valve during the leading of exhaust gas to a heat exchanger when the valve device shown in FIG. 2 is applied to the exhaust heat recovery system.

On the other hand, in an exhaust heat recovery mode shown in FIG. 7, the first butterfly valve 30 is in a closing state which closes the first passage 11 as shown in FIG. 4A, and the second butterfly valve 40 is in an opening state which opens the second passage 12 as shown in FIG. 5A.

In this case, exhaust gas of the engine 1 passes the circumvention exhaust gas pipe 4 from the main exhaust gas pipe 3 and goes through the heat exchanger 5, then returns to the main exhaust gas pipe 3 and is discharged outside.

Here, due to the flowing resistance inside the heat exchanger 5, the pressure of exhaust gas flowing inside the second passage 12 becomes high, and exhaust gas inside the second passage 12 may flow into the first passage 11 through the clearance between the valve shaft holes 14 and the valve shaft 20 as shown by the arrow LF in FIG. 7.

In this case, the downstream side of the valve shaft holes 14 in the first passage 11 is blocked by the first butterfly valve 30, therefore the exhaust gas flowed in does not flows in the main exhaust gas pipe 3 toward the downstream side, and can return to the circumvention exhaust gas pipe 4 as shown by the arrow LF in FIG. 7.

For this reason, the exhaust heat of exhaust gas can be effectively utilized.

As mentioned above, according to the valve device M with the aforementioned structure, the structure can be simplified, and the fluid such as exhaust gas can be prevented from leaking outside through the valve shaft hole 15 without increasing the components. Besides, even if the fluid such as exhaust gas leaks from one passage (the second passage 12) to another passage (the first passage 11), the leaked fluid can return to the one passage. For this reason, the heat of the fluid such as exhaust gas can be effectively utilized.

In the aforementioned embodiment, the valve device M provided with two passages (the first passage 11, the second passage 12) and two the butterfly valves (the first butterfly valve 30, the second butterfly valve 40) is shown, but the valve device M is not limited to this.

For example, the following structure can also be adopted, in which the valve device is provided with a body that has one passage and a valve shaft, and one the butterfly valve for opening and closing the passage, and the butterfly valve is disposed so as to close the passage on the downstream side or the upstream side of the valve shaft holes in the flow direction of the fluid.

According to this embodiment, when the butterfly valve is disposed so as to close the passage on the downstream side of the valve shaft hole, the butterfly valve is in a closing state. Even if fluid enters the passage from the clearance between the valve shaft and the valve shaft hole, the entered fluid can be prevented from flowing to the downstream side of the passage.

On the other hand, when the butterfly valve closes the passage on the upstream side of the valve shaft hole, the butterfly valve is in a closing state, and the fluid inside the passage does not flow to the downstream side of the butterfly valve. For this reason, the fluid inside the passage can be prevented from leaking outside the body through the clearance between the valve shaft hole located on the downstream side of the butterfly valve and the valve shaft In the aforementioned embodiment, the situation is shown in which the valve device M of the present invention is applied to the exhaust heat recovery system S of the engine 1, but the situation is not limited to this, and the present invention can also be used to a system which controls other fluids except exhaust gas.

What is claimed is:

1. A valve device, comprising:
   a body that has a first passage and a second passage for passing a fluid and has valve shaft holes;
   a valve shaft, which is passed through the valve shaft holes so as to be rotatable; and
   a first butterfly valve, which is fixed to the valve shaft and is for opening and closing the first passage;
   a second butterfly valve, which is fixed to the valve shaft and is for opening and closing the second passage; wherein
   the first butterfly valve is disposed so as to close the first passage on a downstream side of the valve shaft holes in a flow direction of the fluid while the second butterfly valve is disposed so as to close the second passage on an upstream side of the valve shaft holes in the flow direction of the fluid, wherein
   the first passage is provided with two first sealing parts which contact with the first butterfly valve in a position on the downstream side of the valve shaft holes, the distances of the two first sealing parts from a central line of the valve shaft holes differing from each other, and
   the second passage is provided with two second sealing parts which contact with the second butterfly valve in a position on the upstream side of the valve shaft holes, the distances of the two second sealing parts from the central line of the valve shaft holes differing from each other.

2. The valve device according to claim 1, wherein
   the first butterfly valve is disposed so as to close the first passage on the downstream side which deviates from the central line of the valve shaft holes for a distance greater than the radius of the valve shaft holes, and
   the second butterfly valve is disposed so as to close the second passage on the upstream side which deviates from the central line of the valve shaft holes for a distance greater than the radius of the valve shaft holes.

3. The valve device according to claim 1, wherein
   the valve shaft holes are formed so as to cause the first passage to communicate with the second passage, and the second butterfly valve is for opening and closing the second passage in a phase opposite to the first butterfly valve.

4. The valve device according to claim 3, wherein
   the valve shaft is supported at two ends thereof via a bearing mounted on the body so as to be rotatable.

5. The valve device according to claim 3, comprising
   a spring that presses the valve shaft to one side in an axis direction of the valve shaft.

6. An exhaust heat recovery system, comprising: a main exhaust gas pipe for passing an exhaust gas of an engine; a circumvention exhaust gas pipe, which diverts from the main exhaust gas pipe; a valve device, which is disposed in a midway of the main exhaust gas pipe and the circumvention exhaust gas pipe; and a heat exchanger, which is connected to the midway of the circumvention exhaust gas pipe and on a downstream side of the valve device; wherein the valve device is the valve device according to claim 3.

* * * * *